United States Patent
Goto et al.

(10) Patent No.: US 10,831,084 B2
(45) Date of Patent: *Nov. 10, 2020

(54) CAMERA ACCESSORY INCLUDING A PLURALITY OF CONTACT TERMINALS

(71) Applicant: NIKON CORPORATION, Tokyo (JP)

(72) Inventors: Takao Goto, Tokyo (JP); Osamu Katsuda, Yokohama (JP); Koji Nagaoka, Yokohama (JP); Takayuki Funaoka, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 124 days.

This patent is subject to a terminal disclaimer.

(21) Appl. No.: 16/170,179

(22) Filed: Oct. 25, 2018

(65) Prior Publication Data
US 2019/0129127 A1    May 2, 2019

(30) Foreign Application Priority Data
Oct. 26, 2017   (JP) .................................. 2017-207116

(51) Int. Cl.
*G03B 17/14*    (2006.01)
*G03B 17/56*    (2006.01)
(Continued)

(52) U.S. Cl.
CPC .............. *G03B 17/14* (2013.01); *G02B 7/022* (2013.01); *G03B 17/56* (2013.01); *G03B 17/565* (2013.01); *H04N 5/2252* (2013.01); *H04N 5/2254* (2013.01)

(58) Field of Classification Search
CPC . G02B 7/022; G02B 7/14; G02B 7/02; G03B 17/14; G03B 17/565; G03B 17/56
(Continued)

(56) References Cited

U.S. PATENT DOCUMENTS 8,770,868 B1   7/2014 Hasuda et al.
2013/0077954 A1   3/2013 Oikawa et al.
(Continued)

FOREIGN PATENT DOCUMENTS

EP   2 648 042 A2   10/2013
JP   2004-117380 A   4/2004
(Continued)

OTHER PUBLICATIONS

Nov. 20, 2018 Decision to Grant a Patent issued in Japanese Patent Application No. 2017-207116.
(Continued)

*Primary Examiner* — Kristina M Deherrera
(74) *Attorney, Agent, or Firm* — Oliff PLC

(57) ABSTRACT

An accessory for a camera body including a plurality of camera-side terminals, a camera-side protruding portion, and an elastic member, the accessory includes: a first terminal that changes a voltage at the first camera-side terminal by contacting with a first camera-side terminal; an eighth terminal to which a first clock signal is input by contacting with a first camera-side clock terminal; a tenth terminal that outputs a second clock signal by contacting with a second camera-side clock terminal; and an accessory-side protruding portion that is to be pressed toward the camera body side by the elastic member, wherein a distance between the eighth terminal and the accessory-side protruding portion and a distance between the tenth terminal and the accessory-side protruding portion are shorter than a distance between the first terminal and the accessory-side protruding portion.

11 Claims, 6 Drawing Sheets

(51) Int. Cl.
*G02B 7/02* (2006.01)
*H04N 5/225* (2006.01)

(58) Field of Classification Search
USPC ........................................................ 359/819
See application file for complete search history.

(56) References Cited

U.S. PATENT DOCUMENTS

| | | | |
|---|---|---|---|
| 2013/0077957 | A1 | 3/2013 | Oikawa et al. |
| 2014/0193145 | A1 | 7/2014 | Hasuda et al. |
| 2019/0129118 | A1* | 5/2019 | Goto ................. G02B 7/022 |

FOREIGN PATENT DOCUMENTS

| JP | 2009-258558 A | 11/2009 |
|---|---|---|
| JP | 2010-237514 A | 10/2010 |
| JP | 2013-080211 A | 5/2013 |
| JP | 2013-214009 A | 10/2013 |
| JP | 2013-231949 A | 11/2013 |
| JP | 2014-013331 A | 1/2014 |
| JP | 2014-021348 A | 2/2014 |
| JP | 2014-038300 A | 2/2014 |
| JP | 2015-035002 A | 2/2015 |
| JP | 2015-099396 A | 5/2015 |

OTHER PUBLICATIONS

U.S. Appl. No. 16/170,080, filed Oct. 25, 2018 in the name of Goto et al.
Dec. 18, 2018 Extended Search Report issued in EP Patent Application No. 18202578.3.
Dec. 18, 2018 Extended Search Report issued in EP Patent Application No. 18202579.1.
May 19, 2020 Office Action issued in U.S. Appl. No. 16/170,080.
Jun. 3, 2020 Office Action issued in European Patent Application No. 18 202 579.1.
Sep. 21, 2020 Notice of Allowance issued in U.S. Appl. No. 16/170,080.
Aug. 28, 2020 Office Action issued in Chinese Patent Application No. 202010135622.0.

* cited by examiner

CAMERA ACCESSORY INCLUDING A PLURALITY OF CONTACT TERMINALS

INCORPORATION BY REFERENCE

The disclosure of the following priority application is herein incorporated by reference: Japanese Patent Application No. 2017-207116 filed Oct. 26, 2017.

TECHNICAL FIELD

The present invention relates to an accessory.

BACKGROUND ART

There have been known accessories that can be removably attached to a camera body (for example, see PTL1). The accessories have heretofore been required to be attached to a camera body in a properly useable manner.

CITATION LIST

Patent Literature

PTL1: Japanese Laid-Open Patent Publication No. 2004-117380

SUMMARY OF INVENTION

According to the first aspect of the present invention, an accessory that can be attached to a camera body, the camera body including a plurality of camera-side terminals, a camera-side protruding portion that protrudes toward a center of an opening of a lens mount section, and an elastic member provided at a position corresponding to the camera-side protruding portion, the accessory comprises: a first terminal that is brought into contact with a first camera-side terminal of the plurality of camera-side terminals, wherein the contact with the first camera-side terminal causes a change in a voltage at the first camera-side terminal; an eighth terminal that is brought into contact with a first camera-side clock terminal of the plurality of camera-side terminals, wherein a first clock signal used to transmit a first data signal from the camera body to the accessory is input thereto; a tenth terminal that is brought into contact with a second camera-side clock terminal of the plurality of camera-side terminals, the tenth terminal outputs a second clock signal used to transmit a second data signal from the accessory to the camera body; and an accessory-side protruding portion that is to be pressed toward the camera body side by the elastic member, wherein the eighth terminal and the tenth terminal are arranged such that both of a distance between the eighth terminal and the accessory-side protruding portion and a distance between the tenth terminal and the accessory-side protruding portion are shorter than a distance between the first terminal and the accessory-side protruding portion.

DESCRIPTION OF EMBODIMENTS

First Embodiment

Figure 1:
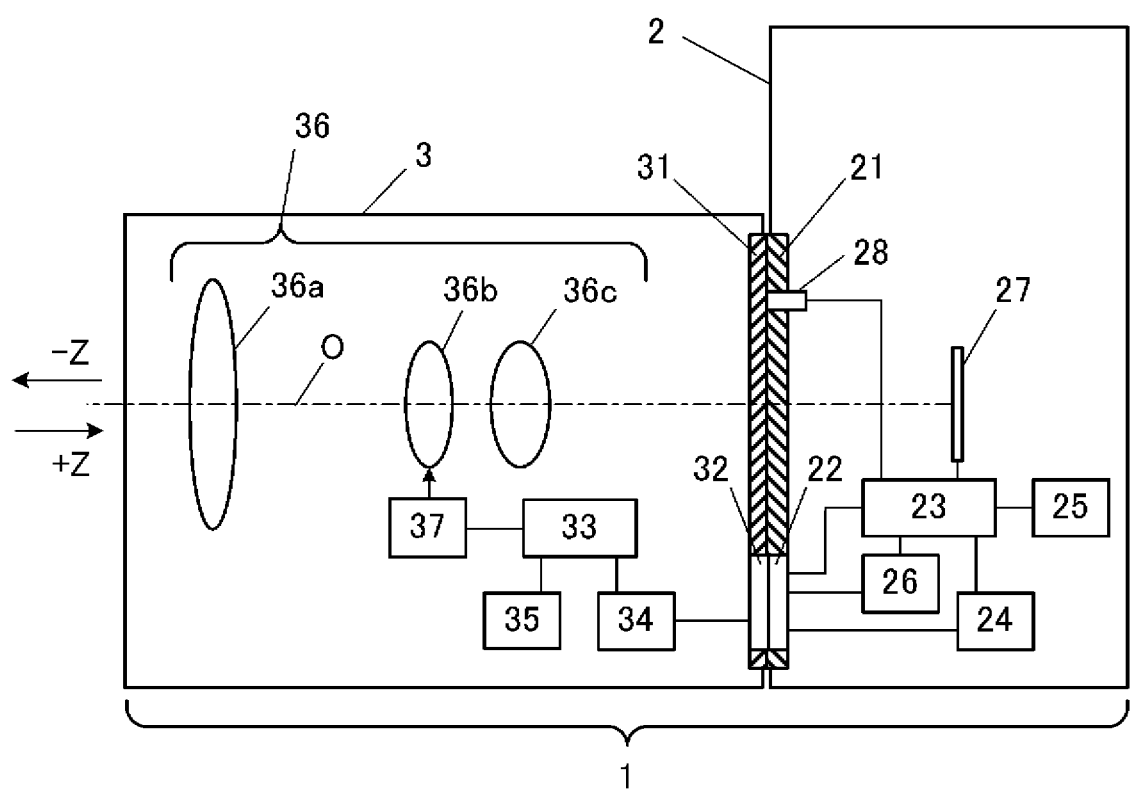
FIG. 1 schematically illustrates a configuration of a camera system.

FIG. 1 schematically illustrates a configuration of a camera system 1 according to the first embodiment. The camera system 1 includes a camera body 2 and an interchangeable lens 3, which represents an example of an accessory that can be removably attached to the camera body 2.

The interchangeable lens 3 includes a lens-side mount 31, a lens-side terminal holding unit 32, a lens-side control unit 33, a lens-side communication unit 34, a lens-side storage unit 35, an imaging optical system 36, and a driving unit 37. The lens-side mount 31 and the lens-side terminal holding unit 32 will be described in detail later.

The lens-side control unit 33 is made up of components such as a microcomputer and its peripheral circuits. The lens-side communication unit 34 performs a data communication with the camera body 2, which will be described later. The lens-side communication unit 34 is connected to both lens-side terminals (as described later) provided on the lens-side terminal holding unit 32 and the lens-side control unit 33. The lens-side storage unit 35 is a nonvolatile storage medium. The lens-side storage unit 35 is connected to the lens-side control unit 33. The lens-side storage unit 35 has pre-stored information such as a predetermined control program to be executed by the lens-side control unit 33. The lens-side control unit 33 controls the interchangeable lens 3 by reading and executing the control program from the lens-side storage unit 35.

The imaging optical system 36 focuses an image of a subject on an imaging surface of the image sensor 27, which will be described later. An optical axis O of the imaging optical system 36 substantially coincides with the center of the lens-side mount 31 and a body-side mount 21, which will be described later. The imaging optical system 36 illustrated in FIG. 1 generally includes a lens 36a, a focusing lens 36b, and a lens 36c. The focusing lens 36b is a lens for adjusting the imaging position for the image of the subject. The driving unit 37 is connected to the lens-side control unit 33 and includes an actuator or the like (not illustrated). The driving unit 37 moves the focusing lens 36b in the optical axis direction (+Z and −Z directions) by means of the actuator or the like.

The camera body 2 includes a body-side mount 21, a body-side terminal holding unit 22, a body-side control unit 23, a body-side communication unit 24, a body-side storage unit 25, a power unit 26, an image sensor 27, and a switch 28 for detecting the state of a lock pin, which will be described later.

The body-side control unit 23 is made up of components such as a microcomputer and its peripheral circuits. It will be noted that the body-side control unit 23 controls various functions of a body, although only communication-related functions are described herein and other functions are omitted. The body-side communication unit 24 performs a data communication with the interchangeable lens 3, which will be described later. The body-side communication unit 24 is connected to both body-side terminals (which will be described later) provided on the body-side terminal holding unit 22 and the body-side control unit 23. Some terminals of the body-side terminal holding unit 22 are connected to the body-side control unit 23, as described later. The body-side storage unit 25 is a nonvolatile storage medium. The body-side storage unit 25 is connected to the body-side control unit 23. The body-side storage unit 25 has pre-stored information such as a predetermined control program to be executed by the body-side control unit 23. The body-side control unit 23 controls the camera body 2 by reading and executing the control program from the body-side storage unit 25.

The power unit 26 includes a power supply and supplies power within the camera body 2 and to the interchangeable lens 3. The power unit 26 is connected to both body-side terminals (which will be described later) provided to the body-side terminal holding unit 22 and the body-side control unit 23. The image sensor 27 is a solid-state image sensor such as CCD and CMOS, for example. The image sensor 27 is connected to the body-side control unit 23 and images a subject to output an imaging signal. Description of processing on an output imaging signal is omitted.

Figure 2:
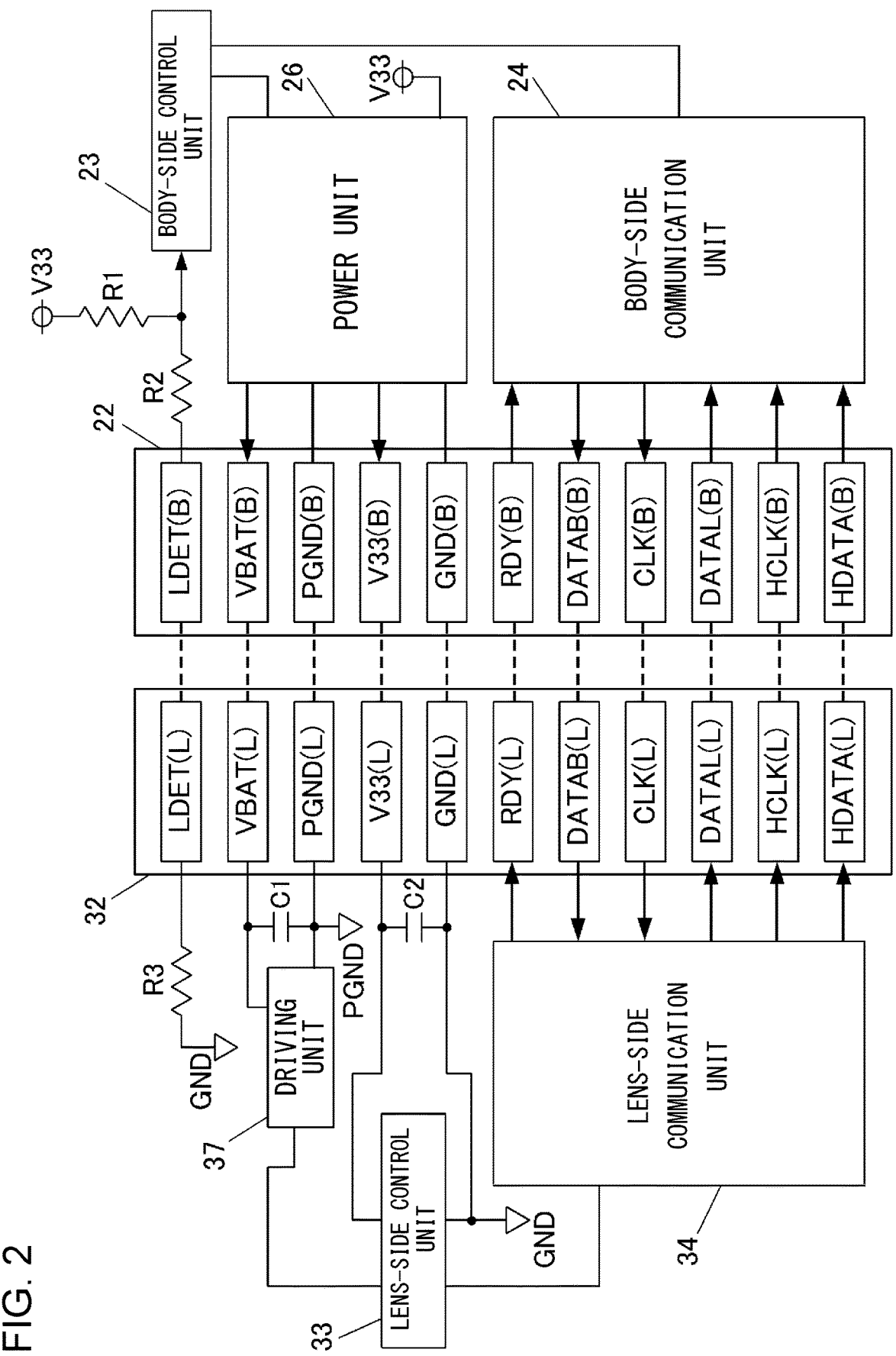
FIG. 2 is a circuit diagram schematically illustrating electrical connections between a camera body and an interchangeable lens.

FIG. 2 is a circuit diagram schematically illustrating electrical connections between the camera body 2 and the interchangeable lens 3. The body-side terminal holding unit 22 includes an LDET (B) terminal, a VBAT (B) terminal, a PGND (B) terminal, a V33 (B) terminal, a GND (B) terminal, an RDY (B) terminal, a DATAB (B) terminal, a CLK (B) terminal, a DATAL (B) terminal, an HCLK (B) terminal, and an HDATA (B) terminal. These 11 pieces of body-side terminals are collectively referred to as body-side terminal group.

The LDET (B) terminal is a terminal for detecting attachment and detachment of the interchangeable lens 3. The LDET (B) terminal is connected to the body-side control unit 23 through a resistor R2. A power supply V33 from the power unit 26 is connected between the body-side control unit 23 and the resistor R2 across a resistor R1 to pull up the LDET (B) terminal.

The VBAT (B) terminal, the PGND (B) terminal, the V33 (B) terminal, and the GND (B) terminal are power supply-related terminals connected to the power unit 26. In FIG. 2, the direction of supplied power is indicated by an arrow. The VBAT (B) terminal is a terminal used for supplying power to the interchangeable lens 3. The power supplied through the VBAT (B) terminal drives the driving unit 37 of the interchangeable lens 3. The driving unit 37 requires voltage and current larger than those to the lens-side control unit 33 to operate and the voltage applied to the VBAT (B) terminal by the power unit 26 is around 10 V at the maximum. In the following description, the voltage applied to the VBAT (B) terminal by the power unit 26 is referred to as a driving system voltage. The PGND (B) terminal is a corresponding ground terminal to the VBAT (B) terminal.

The V33 (B) terminal is a terminal used for supplying power to the interchangeable lens 3. The power supplied through the V33 (B) terminal from the power unit 26 is used to operate the lens-side control unit 33 and the like. The lens-side control unit 33 and the like units are operated by voltage and current smaller than those to the driving unit 37. The voltage applied to the V33 (B) terminal by the power unit 26 is around 3.3 V at the maximum. The voltage applied to the V33 (B) terminal by the power unit 26 is referred to as a circuit-related voltage. The GND (B) terminal is a corresponding ground terminal to the V33 (B) terminal.

The RDY (B) terminal is connected to the body-side communication unit 24. The DATAB (B) terminal, the CLK (B) terminal, the DATAL (B) terminal, the HCLK (B) terminal, and the HDATA (B) terminal are communication-related terminals connected to the body-side communication unit 24. The RDY (B) terminal, the DATAB (B) terminal, the CLK (B) terminal, and the DATAL (B) terminal are used for command data communication, which will be described later. The HCLK (B) terminal and the HDATA (B) terminal are connected to the body-side communication unit 24 and used for hot-line communication, which will be described later. In FIG. 2, the signal flow is indicated by an arrow. A potential on the RDY (B) terminal indicates whether or not the interchangeable lens 3 is ready for command data communication. The DATAB (B) terminal is a terminal from which a data signal is output to the interchangeable lens 3. The CLK (B) terminal is a terminal from which a clock signal is output to the interchangeable lens 3.

The DATAL (B) terminal is a terminal to which a data signal from the interchangeable lens 3 is input.

The HCLK (B) terminal is a terminal to which a clock signal from the interchangeable lens 3 is input. The HDATA (B) terminal is a terminal to which a data signal from the interchangeable lens 3 is input.

The lens-side terminal holding unit 32 includes an LDET (L) terminal (non-limiting example of a "first terminal"), a VBAT (L) terminal (non-limiting example of a "second terminal"), a PGND (L) terminal (non-limiting example of a "third terminal"), a V33 (L) terminal (non-limiting example of a "fourth terminal"), a GND (L) terminal (non-limiting, example of a "fifth terminal"), an RDY (L) terminal (non-limiting example of a "sixth terminal"), a DATAB (L) terminal (non-limiting example of a "seventh terminal"), a CLK (L) terminal (non-limiting example of an "eighth terminal"), a DATAL (L) terminal (non-limiting example of a "ninth terminal"), an HCLK (L) terminal (non-limiting example of a "tenth terminal"), and an HDATA (L) terminal (non-limiting example of an "eleventh terminal"). These 11 pieces of lens-side terminals are collectively referred to as lens-side terminal group. Once the interchangeable lens 3 is attached to the camera body 2, the body-side terminals and the lens-side terminals are electrically connected to each other as illustrated by dashed lines in FIG. 2. Specifically, the LDET (B) terminal is connected with the LDET (L) terminal, the VBAT (B) terminal is connected with the VBAT (L) terminal, the PGND (B) terminal is connected with the PGND (L) terminal, the V33 (B) terminal is connected with the V33 (L) terminal, the GND (B) terminal is connected with the GND (L) terminal, the RDY (B) terminal is connected with the RDY (L) terminal, the DATAB (B) terminal is connected with the DATAB (L) terminal, the CLK (B) terminal is connected with the CLK (L) terminal, the DATAL (B) terminal is connected with the DATAL (L) terminal, the HCLK (B) terminal is connected with the HCLK (L) terminal, and the HDATA (B) terminal is connected with the HDATA (L) terminal. The role of each lens-side terminal is the same as that of a body-side terminal in contact therewith, and thus the description is omitted.

The LDET (L) terminal is grounded through a resistor R3. Once the LDET (L) terminal contacts the LDET (B) terminal, the potential of the LDET (B) terminal is pulled down. The VBAT (L) terminal and the PGND (L) terminal are connected to the driving unit 37. Between the VBAT (L) terminal and the PGND (L) terminal, a so-called bypass capacitor C1 is connected. The V33 (L) terminal and the GND (L) terminal are connected to the lens-side control unit 33 and the like units. A bypass capacitor C2 is connected between the V33 (L) terminal and the GND (L) terminal. The RDY (L) terminal, the DATAB (L) terminal, the CLK (L) terminal, the DATAL (L) terminal, the HCLK (L) terminal, and the HDATA (L) terminal are respectively connected the lens-side communication unit 34.

Description of Command Data Communication

Communication performed such that once a control command (command) is transmitted from the body-side control unit 23 to the lens-side control unit 33 of the interchangeable lens 3, control contents (control data) from the body-side control unit 23 and response contents (response data) from the lens-side control unit 33 are transmitted and received in parallel to each other is referred to as command data communication. The command data communication is a full duplex communication. Through the body-side communication unit 24 and the lens-side communication unit 34, the command data communication is performed by means of a digital data communication using the RDY (B) terminal, the RDY (L) terminal, the DATAB (B) terminal, the DATAB (L) terminal, the CLK (B) terminal, the CLK (L) terminal, the DATAL (B) terminal, and the DATAL (L) terminal.

With command data communication, the body-side control unit 23 transmits and receives various information to and from the interchangeable lens 3 through the body-side communication unit 24 and the lens-side communication unit 34 by transmitting various control commands and control contents to the interchangeable lens 3 and receiving response contents from the interchangeable lens 3. The control commands referenced herein include a transmission command for lens information, for example. Various information received from the interchangeable lens 3 includes type information of the interchangeable lens 3, information indicative of optical properties such as focal length of the imaging optical system 36 and the like, for example. Various information transmitted to the interchangeable lens 3 includes control contents such as an amount of drive of a lens, type information of the camera body 2 and the like, for example. The control commands also include a drive command for the focusing lens 36b and the like. Based on the command data communication, the lens-side control unit 33 receives various control commands from the body-side control unit 23, acquires various information from the body-side control unit 23, and transmits various information to the body-side control unit 23.

Figure 3:
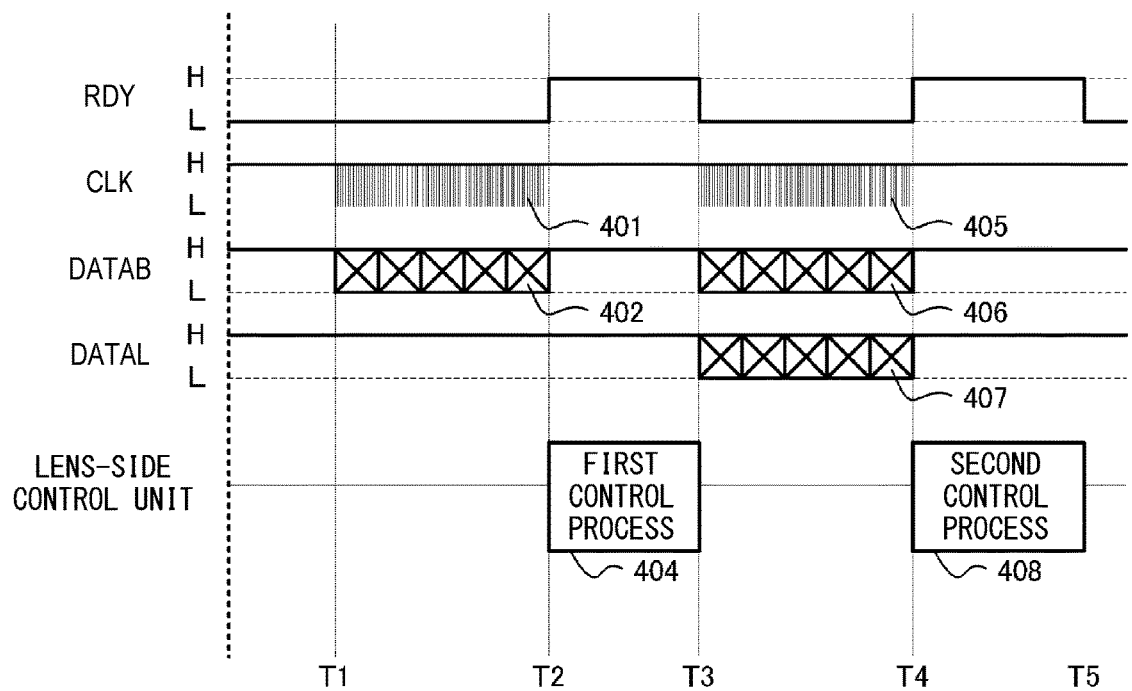
FIG. 3 is a timing chart illustrating an example of command data communication.

FIG. 3 is an example of timing chart illustrating timings of command data communication. First, the body-side control unit 23 verifies a signal level on the RDY (B) terminal at the beginning of the command data communication (T1). The signal level on the RDY (B) terminal indicates whether or not the lens-side control unit 33 is ready for the command data communication. The lens-side control unit 33 sets the signal level (or potential) on the RDY (B) terminal to a high level (H-level) if it is not ready for the command data communication. The lens-side control unit 33 sets the signal level (or potential) on the RDY (L) terminal to a low level (L-level) through the lens-side communication unit 34 if it is ready for the command data communication.

At the beginning of the command data communication (T1), the body-side control unit 23 outputs a clock signal 401 through the body-side communication unit 24 from the CLK (B) terminal if the signal level on the RDY (B) terminal is at the low level (L-level). In other words, the body-side control unit 23 transmits the clock signal 401 to the lens-side control unit 33 through the CLK (B) terminal and the CLK (L) terminal. A frequency repeating between high level and low level of the clock signal 401 in FIG. 3 is 8 MHz, for example. In synchronization with the clock signal 401, the body-side control unit 23 outputs a body-side command signal 402, control commands, from the DATAB (B) terminal. In other words, the body-side control unit 23 transmits the body-side command signal 402 to the lens-side control unit 33 through the DATAB (B) terminal and the DATAB (L) terminal. The body-side command signal 402, which is commanded by switched high and low levels of DATAB in FIG. 3, is a signal indicative of a control that the body-side control unit 23 commands the lens-side control unit 33 by means of the command data communication. For example, the body-side command signal 402 may be a signal indicative of a request for type information of the interchangeable lens 3 or may be a signal indicative of a command to drive the focusing lens 36b.

Upon reception of the body-side command signal 402 through the lens-side communication unit 34, the lens-side control unit 33 uses an error detecting code (for example, checksum data) included in the body-side command signal 402 to execute a checking process for checking for a communication error in the body-side command signal 402. The lens-side control unit 33 then sets the signal level on the RDY (L) terminal to the high level (H-level) (T2). The body-side control unit 23 does not transmit the body-side command signal 402 if the signal level on the RDY (B) terminal is at the high level. The lens-side control unit 33 starts a first control process 404 based on a command from the received body-side command signal 402.

Upon completion of the first control process 404, the lens-side control unit 33 sets the signal level on the RDY (L) terminal to the low level (L-level) through the lens-side communication unit 34 (T3). In response to the signal level on the RDY (B) terminal being set to the low level, the body-side control unit 23 outputs a clock signal 405 from the CLK (B) terminal. In other words, the body-side control unit 23 transmits the clock signal 405 through the CLK (B) terminal and the CLK (L) terminal to the lens-side control unit 33. In addition, the body-side control unit 23 does not transmit or receive a body-side data signal 406 and a lens-side data signal 407, if the signal level on the RDY (B) terminal is at the high level.

In synchronization with the clock signal 405, the body-side control unit 23 outputs a body-side data signal 406 from the DATAB (B) terminal through the body-side communication unit 24. In other words, the body-side control unit 23 transmits the body-side data signal 406 to the lens-side control unit 33 through the DATAB (B) terminal and the DATAB (L) terminal. The body-side data signal 406 is a signal indicative of a control parameter for the body-side command signal 402. For example, in the case where the body-side command signal 402 is a signal indicative of a command to drive the focusing lens 36b, the corresponding body-side data signal 406 may be a signal indicative of the amount of drive of the focusing lens 36b. Alternatively, the body-side data signal 406 may be a signal indicative of information required by the lens-side control unit 33 in the command data communication, such as type information of the camera body.

Upon input of the clock signal 405 to the CLK (L) terminal, the lens-side control unit 33 outputs the lens-side data signal 407 from the DATAL (L) terminal in synchronization with the clock signal 405. The lens-side data signal 407, which is indicated by switched high and low levels of DATAL in FIG. 3, is a signal transmitted by the lens-side control unit 33 to the body-side control unit 23 by means of the command data communication. For example, in the case where the body-side command signal 402 is a signal indicative of a request for type information of the interchangeable lens 3, the corresponding lens-side data signal 407 may be a signal indicative of the type information of the interchangeable lens 3.

Upon completion of the transmission of the lens-side data signal 407, the lens-side control unit 33 again sets the signal level on the RDY (L) terminal to the high level (T4). The lens-side control unit 33 starts a second control process 408 (which will be described later) based on an indication from the received body-side data signal 406.

The first and second control processes 404 and 408 executed by the lens-side control unit 33 will now be described. For example, description will now be made as to the case where the received body-side command signal 402 contains a request for particular information on the interchangeable lens 3. As the first control process 404, the lens-side control unit 33 executes a process for generating requested information as the lens-side data signal 407. The lens-side data signal 407 generated in the first control process 404 is transmitted to the body-side control unit 23 through the lens-side communication unit 34, the DATAL (L) terminal, the DATAL (B) terminal, and the body-side communication unit 24.

For example, description will now be made as to the case where the received body-side command signal 402 contains a signal indicative of a command to drive the focusing lens 36b. As the first control process 404, the lens-side control unit 33 executes a process for generating a signal indicative of the reception of the signal indicative of a command to drive the focusing lens 36b. The signal generated in the first control process 404 is transmitted as the lens-side data signal 407 to the body-side control unit 23 through the lens-side communication unit 34, the DATAL (L) terminal, the DATAL (B) terminal, and the body-side communication unit 24. As the second control process 408, the lens-side control unit 33 executes a process for driving the focusing lens 36b by the amount of drive specified in the body-side data signal 406.

Upon completion of the second control process 408, the lens-side control unit 33 sets the signal level on the RDY (L) terminal to the low level through the lens-side communication unit 34 (T5).

Communication conducted in the above timings T1 to T5 constitutes one period of the command data communication. In one period of the command data communication, the body-side command signal 402 and the body-side data signal 406 are transmitted by the body-side control unit 23. In other words, a combination of the body-side command signal 402 and the body-side data signal 406 constitutes one control data.

As described above, the lens-side control unit 33 receives control data from the body-side control unit 23 and transmits response data to the body-side communication unit 24 in parallel. In other words, the command data communication is a so-called full duplex communication.

Description of Hot-Line Communication

There is provided another communication path on which data is transmitted in one direction from the lens-side control unit 33 of the interchangeable lens 3 to the body-side control unit 23 of the camera body 2, which is referred to as hot-line communication. The hot-line communication refers to data communication between the body-side control unit 23 and the lens-side control unit 33 through the body-side communication unit 24 and the lens-side communication unit 34 by means of the HCLK (B) terminal, the HCLK (L) terminal, the HDATA (B) terminal, and the HDATA (L) terminal. The body-side control unit 23 acquires information related to a state of the interchangeable lens 3 from the lens-side control unit 33 of the interchangeable lens 3 by means of the hot-line communication. The information related to a state of the interchangeable lens 3 may be, for example, a position of the focusing lens 36b, a position of an image blur correction lens (not illustrated), and a position of an aperture. The image blur correction lens is a member that can be moved (driven) to contain components perpendicular to the direction of the optical axis, and the aperture is a member that can be moved (driven) to change the size of an opening through which light flux passes. In the hot-line communication, once a command to start communication is transmitted from the camera body in the command data communication, the lens-side control unit 33 autonomously transmits lens data to the body-side control unit 23 irrespective of (independently of) the command data communication until a command to end the communication is arrived.

Figure 4:
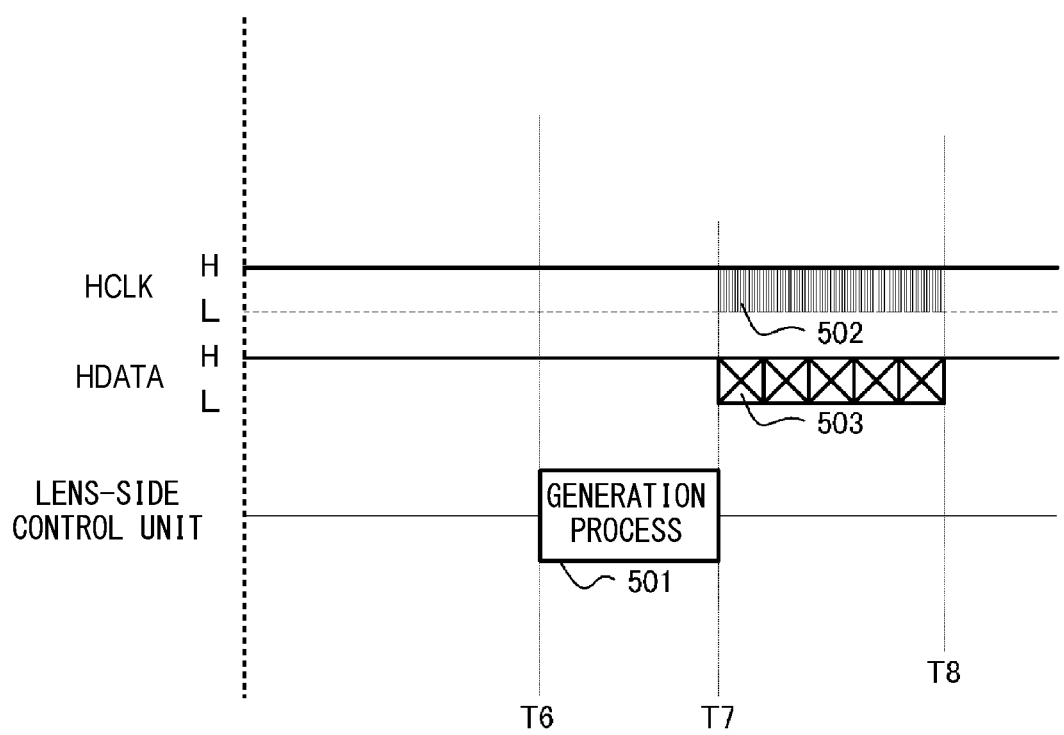
FIG. 4 is a timing chart illustrating examples of hot-line communication.

FIG. 4 is a timing chart illustrating timings of hot-line communication. Upon reception of a command to start the hot-line communication from the body-side control unit 23 of the camera body in the command data communication (T6), the lens-side control unit 33 executes a generation process 501. The generation process 501 refers to a process in which a state of a lens is acquired in a sampling frequency of, for example, 1 ms and a lens signal 503 for the hot-line communication is generated. Upon completion of the generation of the lens signal 503 (T7), the lens-side control unit 33 outputs a clock signal 502 through the lens-side communication unit 34 from the HCLK (L) terminal. In other words, the clock signal 502 is transmitted to the body-side control unit 23 through the HCLK (L) terminal and HCLK (B) terminal. A frequency repeating between high level and low level of the clock signal 502 in FIG. 4 is 8 MHz to 20 MHz, for example. Specifically, the frequency of the clock signal 502 in the hot-line communication is at the same level as or higher than the frequency of the clock signal 401 in the command data communication.

The lens-side control unit 33 outputs the lens signal 503 (for example, information related to a position of the focusing lens 36b) generated in the generation process 501 through the lens-side communication unit 34 from the HDATA (L) terminal in synchronization with the clock signal 502. In other words, the lens-side control unit 33 transmits the lens signal 503 to the body-side control unit 23 through the lens-side communication unit 34, the HDATA (L) terminal, the HDATA (B) terminal, and the body-side communication unit 24. The lens signal 503, which is indicated by switched high and low levels of HDATA in FIG. 4, is a signal transmitted by the lens-side control unit 33 to the body-side control unit 23 by means of the hot-line communication. The output of the clock signal 502 and the lens signal 503 ends at a timing T8.

The lens-side control unit 33 repeats the transmission of the lens data in the hot-line communication every certain period (for example, for every 1 ms) until a command to end the transmission of the lens signal 503 is received by means of the command data communication.

All or a part of the command data communication and the hot-line communication can be performed in parallel. In other words, the body-side control unit 23 and the lens-side control unit 33 can start or end the hot-line communication during the command data communication. Similarly, they can start or end the command data communication during the hot-line communication.

As described above, in the hot-line communication, the communication is performed independently of the command communication. The lens-side control unit 33 transmits information related to a state of the interchangeable lens 3 to the body-side control unit 23 irrespective of the command communication by means of the hot-line communication. Consequently, the body-side control unit 23 can continuously grasp the state of the interchangeable lens 3 even during the command communication. In this way, the body-side control unit 23 can continuously grasp the position of the focusing lens 36b, and thus can control auto-focusing at high speed, for example. The same applies to an image blur correction control and an aperture control. The body-side control unit 23 can provide various commands for the interchangeable lens 3 by means of the command communication in any timing even while the lens-side control unit 33 is performing the hot-line communication.

Description of Lens Mount Mechanism

The camera system 1 according to the present embodiment includes a lens mount mechanism of a so-called bayonet type. Description will now be made as to a body-side mount 21 on the camera body 2 and a lens-side mount 31 on the interchangeable lens 3 in order.

Figure 5A:
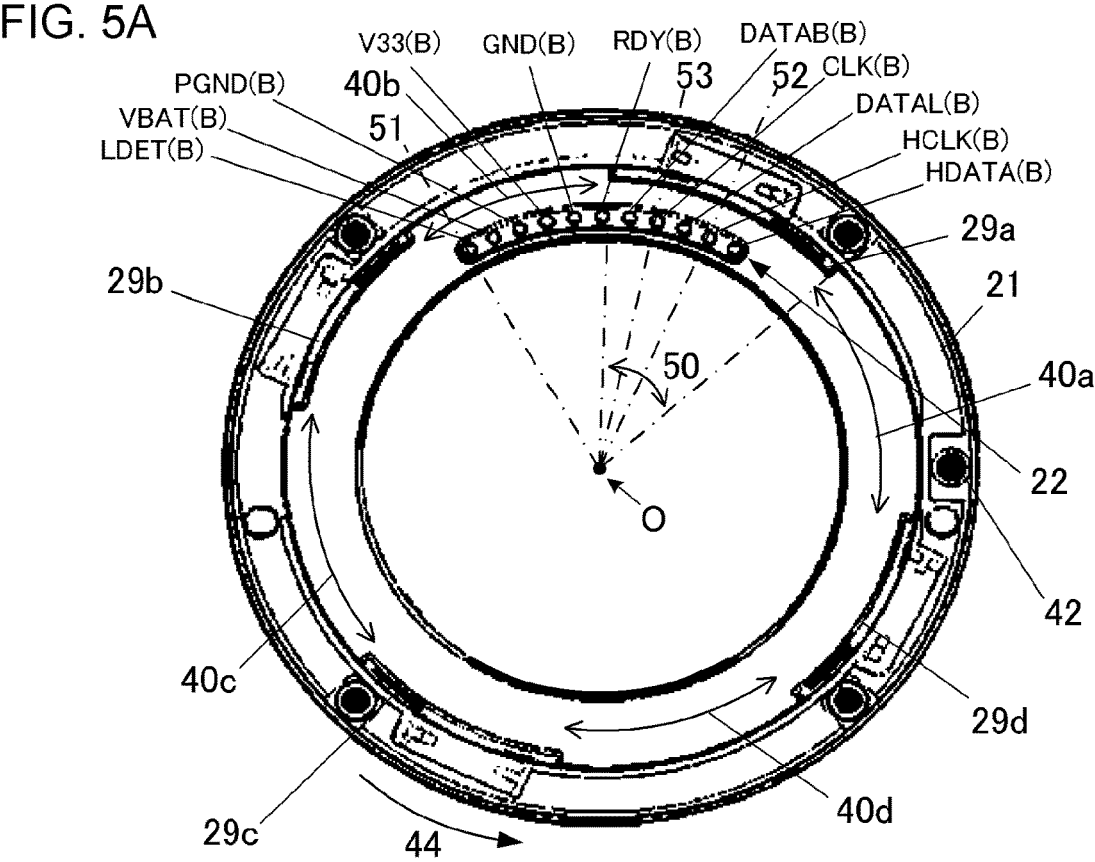
FIG. 5A is a front view schematically illustrating a mount surface of the camera body as viewed from the side of the interchangeable lens.

FIG. 5A schematically illustrates a mount of the camera body 2 as viewed from the side of the interchangeable lens 3. The camera body 2 includes the body-side mount 21 and the body-side terminal holding unit 22 as described with reference to FIG. 1. The body-side mount 21 has a reference plane of a ring shape that has a constant width. The body-side mount 21 also includes a first body-side claw (or tab) 29a, a second body-side claw 29b, a third body-side claw 29c, and a fourth body-side claw 29d. In the following description, these four claws are collectively referred to as body-side claws 29.

The body-side claws 29 are spaced apart from each other along a circular opening in the body-side mount 21. As illustrated in FIG. 5A, the first body-side claw 29a is located at an upper right position, the second body-side claw 29b is located at an upper left position, the third body-side claw 29c is located at a lower left position, and the fourth body-side claw 29d is located at a lower right position.

The length of each of the first to fourth body-side claws 29a to 29d in a circumferential direction is different from each other. Specifically, the first body-side claw 29a is the longest, the third body-side claw 29c is the second longest, the fourth body-side claw 29d is the third longest, and the second body-side claw 29b is the shortest.

The body-side claws 29 protrude from the body-side mount 21 toward the center of the opening and there are sections with body-side claws 29 and sections without body-side claws 29 on the circumstance of the opening. In the following description, a space 40a between the first body-side claw 29a and the fourth body-side claw 29d on the circumstance of the opening in the body-side mount 21 is referred to as a first body-side through section (insertion/extraction section) 40a. Similarly, a space 40b between the first body-side claw 29a and the second body-side claw 29b is referred to as a second body-side through section 40b, a space 40c between the second body-side claw 29b and the third body-side claw 29c is referred to as a third body-side through section 40c, and a space 40d between the third body-side claw 29c and the fourth body-side claw 29d is referred to as a fourth body-side through section 40d. These four body-side through sections are collectively referred to as body-side through sections 40.

In the inside of the opening of the body-side mount 21, the body-side terminal holding unit 22 is located. The body-side terminal holding unit 22 has an arc shape corresponding to the shape of the ring-shaped body-side mount 21. Preferably, the body-side terminal holding unit 22 is located on an upper portion of the opening in the body-side mount 21 along the opening in the body-side mount 21, in the center of the upper portion as illustrated in FIG. 5A. The body-side terminal holding unit 22 includes a plurality of body-side terminals as described above. The plurality of body-side terminals are arranged in the body-side terminal holding unit 22 in arc shape in one line inside the body-side mount 21. As illustrated in FIG. 5A, the plurality of body-side terminals include 11 pieces of terminals arranged from right: HDATA (B), HCLK (B), DATAL (B), CLK (B), DATAB (B), RDY (B), GND (B), V33 (B), PGND (B), VBAT (B), and the leftmost LDET (B). Each body-side terminal is a conductive pin. The body-side terminals are forced with a spring or the like (not illustrated) in the −Z direction (FIG. 1). The −Z direction is a direction toward the interchangeable lens 3 attached to the camera and also a direction of a subject.

The body-side mount 21 includes a through hole for a lock pin 42. The through hole for the lock pin 42 is located to the upper right of the fourth body-side claw 29d. In other words, the through hole for the lock pin 42 is located in the ring-shaped reference plane between an area where the fourth body-side claw 29d is present and an area where the first body-side claw 29a is present in the opening in the body-side mount 21. The lock pin 42 is forced with a spring or the like (not illustrated) in the −Z direction (FIG. 1).

Figure 5B:
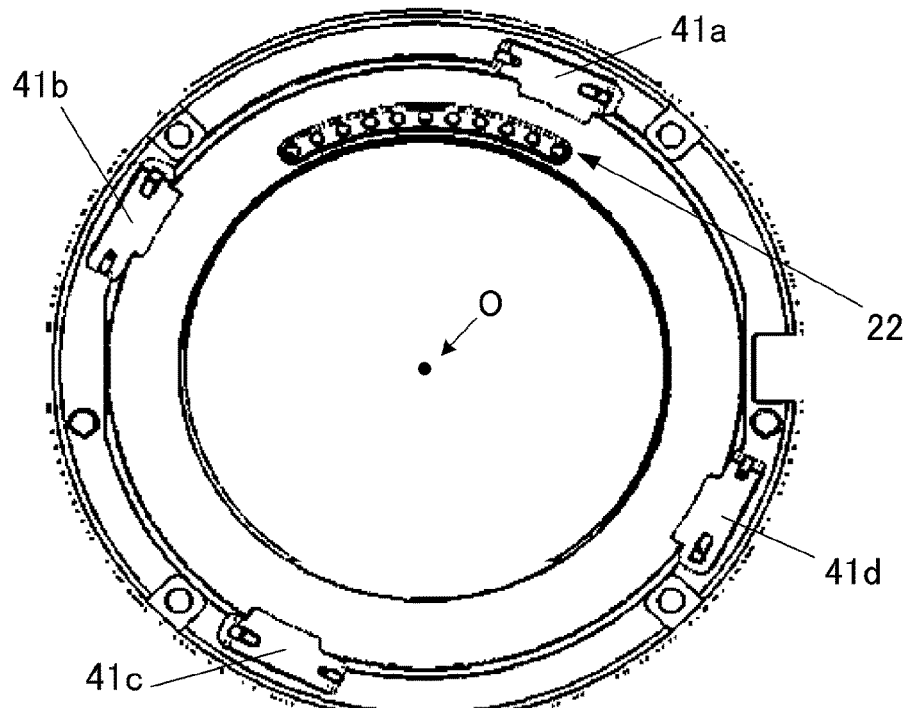
FIG. 5B is a front view schematically illustrating the camera body in the that the mount of the camera body has been removed as viewed from the side of the interchangeable lens.

FIG. 5B is a schematic drawing illustrating the camera body 2 in the state that the body-side mount 21 has been removed as viewed from the side of the interchangeable lens 3. A first flat spring 41a is provided in a position corresponding to the first body-side claw 29a (behind the first body-side claw 29a). Similarly, a second flat spring 41b is provided in a position corresponding to the second body-side claw 29b (behind the second body-side claw 29b), a third flat spring 41c is provided in a position corresponding to the third body-side claw 29c (behind the third body-side claw 29c), and a fourth flat spring 41d is provided in a position corresponding to the fourth body-side claw 29d (behind the fourth body-side claw 29d). In the following description, these four flat springs are collectively referred to as flat springs 41. The flat springs 41 press the lens-side claws described later in the +Z direction (toward the camera body 2).

Figure 6:
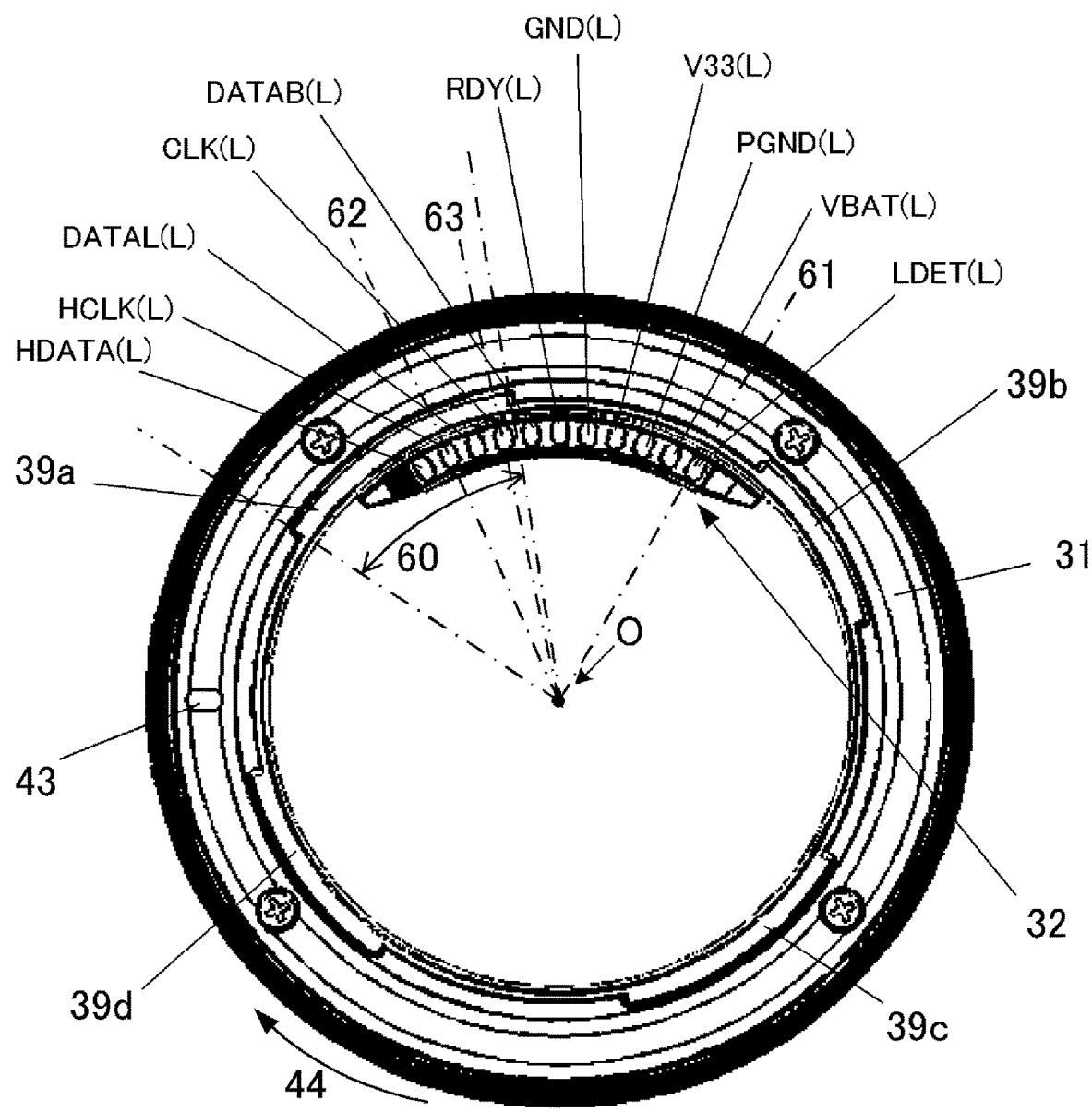
FIG. 6 is a front view schematically illustrating a mount surface of the interchangeable lens as viewed from the side of the camera body.

FIG. 6 schematically illustrates a mount of the interchangeable lens 3 as viewed from the side of the camera body 2. The interchangeable lens 3 includes the lens-side mount 31 and the lens-side terminal holding unit 32 as described with reference to FIG. 1. The lens-side mount 31 has a reference plane of a ring shape that has a constant width. Once the interchangeable lens 3 is attached to the camera body 2, the ring-shaped reference plane of the lens-side mount 31 is in contact with the ring-shaped reference plane of the body-side mount 21 described above. The lens-side mount 31 includes a cylindrical section extending in the optical axis direction on its inner circumstance. Along the outer circumstance of the cylindrical section, the lens-side mount 31 includes a first lens-side claw 39a, a second lens-side claw 39b, a third lens-side claw 39c, and a fourth lens-side claw 39d that are spaced apart from each other. In the following description, these four claws are collectively referred to as lens-side claws 39.

The lens-side claws 39 protrude from the outer circumstance of the cylindrical section of the lens-side mount 31 outward of the mount (radially from the optical axis O). As illustrated in FIG. 6, the first lens-side claw 39a is located at an upper left position, the second lens-side claw 39b is located at an upper right position, the third lens-side claw 39c is located at a lower right position, and the fourth lens-side claw 39d is located at a lower left position. Behind each of the lens-side claws 39 (on the side of the reference plane of the lens-side mount 31), there is a space where the corresponding one of body-side claws 29 enters once the interchangeable lens 3 is attached to the camera body 2.

In the inside of an opening of the lens-side mount 31, the lens-side terminal holding unit 32 is located. The lens-side terminal holding unit 32 has an arc shape corresponding to the shape of the ring-shaped lens-side mount 31. Preferably, the lens-side terminal holding unit 32 is located on an upper portion of the lens-side mount 31 along the opening in the lens-side mount 31, in the center of the upper portion as illustrated in FIG. 6. The lens-side terminal holding unit 32 includes a plurality of lens-side terminals as described above. The plurality of lens-side terminals are arranged in the lens-side terminal holding unit 32 in arc shape in one line inside the lens-side mount 31. As illustrated in FIG. 6, the plurality of lens-side terminals include 11 pieces of terminals arranged from right: LDET (L), VBAT (L), PGND (L), V33 (L), GND (L), RDY (L), DATAB (L), CLK (L), DATAL (L), HCLK (L), and HDATA (L). The lens-side terminals are arranged such that a conductive contact surface of each terminal is exposed in the +Z direction (FIG. 1). The +Z direction is a direction in which light from a subject passing through the imaging optical system 36 travels toward the image sensor 27.

The lens-side mount 31 includes a lock pin receiving section 43. As illustrated in FIG. 6, the lock pin receiving section 43 is located to the upper left of the fourth lens-side claw 39d. In other words, the lock pin receiving section 43 is located between a portion corresponding to the first lens-side claw 39a and a portion corresponding to the fourth lens-side claw 39d in the lens-side mount 31. The lock pin receiving section 43 is a groove accommodating the lock pin 42 once the interchangeable lens 3 is attached to the camera body 2. The direction of the depth of the groove is provided along the −Z direction (FIG. 1).

Once the interchangeable lens 3 is attached to the camera body 2, the plurality of body-side terminals are physically in contact with their respective corresponding lens-side terminals. The contact electrically connects the plurality of body-side terminals with the plurality of lens-side terminals. In other words, the plurality of body-side terminals and the plurality of lens-side terminals are in electrical continuity with each other.

Attachment of Interchangeable Lens

Description will now be made as to how the interchangeable lens 3 is attached to the camera body 2. To attach the interchangeable lens 3 to the camera body 2, first the lend-side mount 31 is placed face to face with the body-side mount 21, then the first lens-side claw 39a is aligned with the first body-side through section 40a, the second lens-side claw 39b is aligned with the second body-side through section 40b, the third lens-side claw 39c is aligned with the third body-side through section 40c, and the fourth lens-side claw 39d is aligned with the fourth body-side through section 40d. Then, the first lens-side claw 39a is inserted into the first body-side through section 40a, the second lens-side claw 39b is inserted into the second body-side through section 40b, the third lens-side claw 39c is inserted into the third body-side through section 40c, and the fourth lens-side claw 39d is inserted into the fourth body-side through section 40d. At this time, the LDET (L) terminal is brought into contact with the CLK (B) terminal, the VBAT (L) terminal is brought into contact with the DATAL (B) terminal, the PGND (L) terminal is brought into contact with the HCLK (B) terminal, and the V33 (L) terminal is brought into contact with the HDATA (B) terminal.

From this state, the interchangeable lens 3 is rotated in an attachment direction 44 as illustrated in FIGS. 5A and 6. Consequently, the first body-side claw 29a enters a space behind the first lens-side claw 39a, the second body-side claw 29b enters a space behind the second lens-side claw 39b, the third body-side claw 29c enters a space behind the third lens-side claw 39c, and the fourth body-side claw 29d enters a space behind the fourth lens-side claw 39d. At this time, the plurality of lens-side terminals are brought into contact with the plurality of body-side terminals in order. Instead of the interchangeable lens 3, the camera body 2 may be rotated in the reverse direction with respect to the attachment direction 44 illustrated in FIGS. 5A and 6.

While the lens-side claws 39 are inserted in their corresponding body-side through sections 40 and the interchangeable lens 3 is rotated in the attachment direction 44, for example, the LDET (L) terminal is brought into contact with the CLK (B) terminal, the DATAB (B) terminal, the RDY (B) terminal, the GND (B) terminal, the V33 (B) terminal, the PGND (B) terminal, the VBAT (B) terminal and the LDET (B) terminal, in order. For example, the VBAT (L) terminal is brought into contact with the DATAL (B) terminal, the CLK (B) terminal, the DATAB (B) terminal, the RDY (B) terminal, the GND (B) terminal, the V33 (B) terminal, the PGND (B) terminal, and the VBAT (B) terminal, in order. For example, the PGND (L) terminal is brought into contact with the HCLK (B) terminal, the DATAL (B) terminal, the CLK (B) terminal, the DATAB (B) terminal, the RDY (B) terminal, the GND (B) terminal, the V33 (B) terminal, and the PGND (B) terminal, in order. For example, the V33 (L) terminal is brought into contact with the HDATA (B) terminal, the HCLK (B) terminal, the DATAL (B) terminal, the CLK (B) terminal, the DATAB (B) terminal, the RDY (B) terminal, the GND (B) terminal, and the V33 (B) terminal, in order. For example, the GND (L) terminal is brought into contact with the HDATA (B) terminal, the HCLK (B) terminal, the DATAL (B) terminal, the CLK (B) terminal, the DATAB (B) terminal, the RDY (B) terminal, and the GND (B) terminal, in order.

For example, the RDY (L) terminal is brought into contact with the HDATA (B) terminal, the HCLK (B) terminal, the DATAL (B) terminal, the CLK (B) terminal, the DATAB (B) terminal, and the RDY (B) terminal, in order. For example, the DATAB (L) terminal is brought into contact with the HDATA (B) terminal, the HCLK (B) terminal, the DATAL (B) terminal, the CLK (B) terminal, and the DATAB (L) terminal, in order. For example, the CLK (L) terminal is brought into contact with the HDATA (B) terminal, the HCLK (B) terminal, the DATAL (B) terminal, and the CLK (B) terminal, in order. For example, the DATAL (L) terminal is brought into contact with the HDATA (B) terminal, the HCLK (B) terminal, and the DATAL (B) terminal, in order. For example, the HCLK (L) terminal is brought into contact with the HDATA (B) terminal and the HCLK (B) terminal, in order.

Upon rotating the interchangeable lens 3 by a predetermined angle with respect to the camera body 2, an attachment completion position is reached. In the attachment completion position, the body-side claws 29 and the lens-side claws 39 are placed face to face with each other in the optical axis direction, and the lock pin 42 is pushed in the −Z direction in FIG. 1 into the lock pin receiving section 43. Once the lock pin 42 enters the lock pin receiving section 43, the interchangeable lens 3 cannot be rotated with respect to the camera body 2 to remove the lens. In other words, once the body-side claws 29 and the lens-side claws 39 reach a predetermined attachment completion position, the relative position between the body-side mount 21 and the lens-side mount 31 is fixed. The lens-side claws 39 are pressed to the body side (+Z direction in FIG. 1) by the flat springs 41. Thereby, each of the plurality of lens-side terminals is in contact with and electrically connected to each of their respective corresponding body-side terminals.

In the following description, the state where the body-side claws 29 and the lens-side claws 39 reach the attachment completion position is referred to as an attachment completion state. During rotation from the position where the lens-side claw 39 is inserted into the body-side through section 40 to a position immediately before the attachment completion position or during rotation from a position immediately before the attachment completion position to the insertion position is referred to as an attachment incompletion state.

During the attachment incompletion state, the signal level of the LDET (B) terminal is pulled up and at a high level. While it is detected that the signal level of the LDET (B) terminal is at a high level, the body-side control unit 23 determines that the interchangeable lens 3 is not attached. While the interchangeable lens 3 is not attached, the body-side control unit 23 does not allow the power unit 26 to supply power to the VBAT (B) terminal and the V33 (B) terminal.

In the attachment completion state, the signal level of the LDET (B) terminal is pulled down to a low level as described above (FIG. 2). Upon detection of the signal level of the LDET (B) terminal reaching a low level, the body-side control unit 23 determines that the interchangeable lens 3 is attached. Also in the attachment completion state, the lock pin 42 enters the lock pin receiving section 43 and a switch 28 (FIG. 1) associated with the lock pin 42 is turned on. Upon detection of the signal level of the LDET (B) terminal reaching a low level and the switch 28 being turned on, the body-side control unit 23 causes the power unit 26 to start supplying power to the V33 (B) terminal. It will be noted that the camera body 2 is not necessarily provided with the switch 28. In the case where the switch 28 is not provided, the power unit 26 may be allowed to supply power to the V33 (B) terminal upon detection of the signal level of the LDET (B) terminal reaching a low level.

Once the supply of power to the V33 (B) terminal is started, power is supplied to the lens-side control unit 33 of the interchangeable lens 3 through the V33 (L) terminal and the lens-side control unit 33 starts operation. The lens-side control unit 33, that has started operation, permits initial communication with the body-side control unit 23 by means of the command data communication. After the lens-side control unit 33 permits initial communication, the body-side control unit 23 starts the initial communication. The initial communication includes a request for a power supply to the VBAT (L) terminal by the lens-side control unit 33. Once a signal requesting for a power supply to the VBAT (L) terminal is transmitted from the lens-side control unit 33 to the body-side control unit 23, the body-side control unit 23 supplies power to the VBAT (B) terminal and an initialization process between the camera body 2 and the interchangeable lens 3 is executed. In the initialization process, information required for various operations of the camera system 1, such as imaging operation and focus adjusting operation, is exchanged between the camera body 2 and the interchangeable lens 3, a lens position of the interchangeable lens is transferred to a reference position, and so on.

In the attachment completion state, upon an unlocking button (not illustrated) of the camera body being pressed by a user, the lock pin 42 retracts from the lock pin receiving section 43. This allows the relative position between the body-side mount 21 and the lens-side mount 31 to be changed. Upon an unlocking button (not illustrated) being pressed by a user to turn off the switch 28 associated with the unlocking button, the body-side control unit 23 causes the power unit 26 to stop supplying power to the VBAT (B) terminal and the V33 (B) terminal. From that state, while the interchangeable lens 3 is rotated in a direction opposite to the attachment direction 44 as illustrated in FIGS. 5A and 6, the plurality of lens-side terminals are brought into contact with the plurality of body-side terminals in the reverse order to that as described above.

The supply of power may not be stopped in response to the operation of the unlocking button. In this case, upon detection of the signal level of the LDET (B) terminal changing from the low level to the high level because the LDET (L) terminal is separated from the LDET (B) terminal due to the rotation of the interchangeable lens 3 in the direction opposite to the attachment direction 44, the body-side control unit 23 causes the power unit 26 to stop supplying power to the VBAT (B) terminal and the V33 (B) terminal. In this way, the number of components of the camera system 1 can be reduced. It will be noted that, the body-side control unit 23 may cause the power unit 26 to stop supplying power to the VBAT (B) terminal and the V33 (B) terminal, upon detection of both the unlocking button being pressed and the signal level of the LDET (B) terminal changing from the low level to the high level. Alternatively, the body-side control unit 23 may cause the power unit 26 to stop supplying power to the VBAT (B) terminal and the V33 (B) terminal, upon detection of either one of the unlocking button being pressed or the signal level of the LDET (B) terminal changing from the low level to the high level.

As described above, during attachment and removal of the interchangeable lens to and from the camera body (the attachment incompletion state), the lens-side terminals are brought into contact with other body-side terminals than those intended to match upon completion of attachment. It is preferable that the arrangement of lens-side and body-side terminals should cause less trouble that may occur due to the contact during attachment and removal.

Terminal Arrangement with Noises Taken into Consideration

In the present embodiment, among the plurality of body-side terminals, the LDET (B) terminal is positioned at the headmost end in the attachment direction (the arrow 44 in FIG. 5A) of the lens. In other words, the location of the LDET (B) terminal is the leftmost side of the body-side terminal group in FIG. 5A as described above. Similarly, among the plurality of lens-side terminals, the LDET (L) terminal is positioned at the headmost end in the attachment direction (the arrow 44 in FIG. 6) of the lens. In other words, the location of the LDET (L) terminal is the rightmost side of the lens-side terminal group in FIG. 6 as described above. Consequently, the LDET (B) terminal is not brought into contact with other lens-side terminals than the LDET (L) terminal until the attachment of the interchangeable lens is completed. As a result, the signal level of the LDET (B) terminal is not accidentally be brought to the low level in the process of attachment of the interchangeable lens, and thus an erroneous recognition of the lens attachment can be avoided.

In the present embodiment, the VBAT (B) terminal is positioned next to the LDET (B) terminal, that is, at the second place from the headmost end in the attachment direction. The VBAT (L) terminal is positioned next to the LDET (L) terminal, that is, at the second place from the headmost end in the attachment direction. The purpose of such arrangement is to reduce the number of lens-side terminals that the VBAT (B) terminal on the camera body side contacts in the process of attachment of the interchangeable lens. The voltage applied to the VBAT (B) terminal is higher than the voltage applied to any other terminals, and if the VBAT (B) terminal is brought into contact with any other terminal than the VBAT (L) terminal in such a situation that a high voltage is applied to the VBAT (B) terminal due to, for example, a failure of the camera system 1, the high voltage may place an unexpected load on electric circuits in the interchangeable lens. In the present embodiment, the VBAT (B) terminal is located next to the LDET (B) terminal, only the LDET (L) terminal among the plurality of the lens-side terminals is brought into contact with the VBAT (B) terminal during attachment of the interchangeable lens 3. As illustrated in FIG. 2, the LDET (L) terminal is grounded through the resistor R3, and even if a high voltage is applied from the VBAT (B) terminal, the camera system 1 may not be affected.

In the present embodiment, the PGND (B) terminal is positioned next to the VBAT (B) terminal, that is, at the third place from the headmost end in the attachment direction. The PGND (L) terminal is positioned next to the VBAT (L) terminal, that is, at the third place from the headmost end in the attachment direction. The capacitor C1 connected to the VBAT (L) terminal is supplied with and charged by a high voltage from the VBAT (B) terminal. While the interchangeable lens 3 is rotated in a removal direction, the VBAT (L) terminal is first brought into contact with the PGND (B) terminal. The charge stored on the capacitor C1 is rapidly discharged through the PGND (B) terminal, which is a ground terminal, and other circuits in the camera system 1 may not be affected.

In the present embodiment, the V33 (B) terminal is positioned next to the PGND (B) terminal, that is, at the fourth place from the headmost end in the attachment direction, and the GND (B) terminal is positioned next to the V33 (B) terminal, that is, at the fifth place from the headmost end. The V33 (L) terminal is positioned next to the PGND (L) terminal, that is, at the fourth place from the headmost end in the attachment direction, and the GND (L) terminal is positioned next to the V33 (L) terminal, that is, at the fifth place from the headmost end. The capacitor C2 connected to the V33 (L) terminal is supplied with and charged by a voltage from the V33 (B) terminal. While the interchangeable lens 3 is rotated in the removal direction, the V33 (L) terminal is first brought into contact with the GND (B) terminal. The charge stored on the capacitor C2 is rapidly discharged through the GND (B) terminal, which is a ground terminal, and other circuits in the camera system 1 may not be affected.

The RDY (B) terminal is positioned next to the GND (B) terminal, that is, at the sixth place from the headmost end, the DATAB (B) terminal is positioned next to the RDY (B) terminal, that is, at the seventh place from the headmost end, the CLK (B) terminal is positioned next to the DATAB (B) terminal, that is, at the eighth place from the headmost end, the DATAL (B) terminal is positioned next to the CLK (B) terminal, that is, at the ninth place from the headmost end, the HCLK (B) terminal is positioned next to the DATAL (B) terminal, that is, at the tenth place from the headmost end, and the HDATA (B) terminal is positioned next to the HCLK (B) terminal, that is, at the last end.

The RDY (L) terminal is positioned next to the GND (L) terminal, that is, at the sixth place from the headmost end, the DATAB (L) terminal is positioned next to the RDY (L) terminal, that is, at the seventh place from the headmost end, the CLK (L) terminal is positioned next to the DATAB (L) terminal, that is, at the eighth place from the headmost end, the DATAL (L) terminal is positioned next to the CLK (L) terminal, that is, at the ninth place from the headmost end, the HCLK (L) terminal is positioned next to the DATAL (L) terminal, that is, at the tenth place from the headmost end, and the HDATA (L) terminal is positioned next to the HCLK (L) terminal, that is, at the last end.

Next, description will be made as to an effect of noise caused by communication lines formed between the body-side terminals and the lens-side terminals. In the hot-line communication, information is transmitted to the body one-sidedly after the communication is started and the communication is performed highly frequently (repeated in a highly short cycle). In the hot-line communication, a clock signal is transmitted from the HCLK (L) terminal to the HCLK (B) terminal. The clock signal is a cyclic signal of high and low levels in a highly short cycle, and thus may be a major cause of noise for other signals. Further, the clock signal transmitted from the HCLK (L) terminal to the HCLK (B) terminal is a signal output from the interchangeable lens 3, so that even if the clock signal is accidentally affected by a noise, the noise cannot be recognized on the side of the camera body 2. Accordingly, a signal flowing through the HCLK terminals may be a cause of noise for the camera body 2 and may be a cause of a fault operation of the camera system 1. Examples of such a fault operation include erroneous detection of attachment of the interchangeable lens and misjudging whether or not the command communication is allowed. In the present embodiment, the HCLK terminal is positioned away from the VBAT terminal to which a high voltage is applied. In addition, the HCLK terminal is positioned away from the RDY terminal such that the HCLK terminal is not adjacent to the RDY terminal that is used to indicate whether or not the command communication is allowed.

The HDATA terminal and the DATAL terminal are arranged on opposite sides of the HCLK terminal. With this arrangement, effects of noises from the HCLK terminal on other terminals than the HDATA terminal and DATAL terminal can be suppressed.

The command data communication is a communication for bi-directionally transmitting and receiving information between the body and the interchangeable lens, as described above. In the command data communication, a clock signal is transmitted from the CLK (B) terminal to the CLK (L) terminal. The clock signal transmitted through the CLK terminals may also be a cause of noise for the same reason as described above. In the present embodiment, therefore, the CLK terminal is positioned away from the VBAT terminal to which a high voltage is applied. In addition, the CLK terminal is positioned away from the RDY terminal such that the HCLK terminal is not adjacent to the RDY terminal that are used to indicate whether or not the command communication is allowed. Further, if the HCLK terminal and the CLK terminal are adjacent to each other, one clock signal may affect the other clock signal, providing a cause of noise. In the present embodiment, the DATAL terminal is positioned between the CLK terminal and the HCLK terminal. In addition, the DATAB terminal is positioned between the CLK terminal and the RDY terminal. In other words, the DATAL terminal and DATAB terminal are arranged on opposite sides of the CLK terminal. Consequently, effects of noises originating from the CLK terminals on the camera system can be suppressed.

As also described above, it is necessary to discriminate the level of the RDY terminals in order to perform the command data communication. This means that a noise has a major effect on imaging operation because the signal level of the RDY terminals are indicative of whether or not the command data can be communicated. Consider here the case where the body-side control unit 23 erroneously recognizes due to a noise that command data can be communicated despite the situation where the command data cannot be communicated. In this case, although the lens-side control unit 33 cannot receive command data, the body-side control unit 23 transits the command data and the body-side control unit 23 erroneously recognizes that control will be made on the interchangeable lens according to the command data. However, since the lens-side control unit 33 cannot accept the command data, the control according to such erroneously transmitted command data is no longer be made. As a result, the operation of the camera system 1 may be disrupted. Accordingly, it is necessary to prevent noises from affecting signals on the RDY terminals. To prevent noises from affecting signals on the RDY terminals, it is desirable that terminals through which relatively stable signals, that is, those signals that have less variation in the signal level per unit time are positioned on opposite sides of the RDY terminal. In the present embodiment, the GND terminal and the DATAB terminal are arranged on opposite sides of the RDY terminal. The GND terminals, which are at ground potential, are stable and the DATAB terminals are also terminals through which more stable signals flow than the CLK terminals and the HCLK terminals. Consequently, effects of noises affecting the RDY terminals can be suppressed.

Next, power supplied from the VBAT (B) terminal to the VBAT (L) terminal is used to drive the actuator (for example, stepping motor) of the driving unit 37 of the interchangeable lens 3. Accordingly, current flowing through the VBAT terminals largely vary between a period in which the actuator is driven and a period in which the actuator is not driven. Such variation in the current may be a cause of noise on signals flowing through other terminals. In the present embodiment: the VBAT terminal is positioned away from the RDY terminal, the DATAB terminal, the CLK terminal, and the DATAL terminal, which are used for the command data communication, and the HCLK terminal and the HDATA terminal, which are used for the hot-line communication. Further, the GND terminal, the V33 terminal, and the PGND terminal are positioned between the VBAT terminal and the terminal used for both modes of the communication. Consequently, effects of noises caused by the variation in current flowing through the VBAT terminals on the data communication can be suppressed.

The terminal arrangement with noises taken into consideration as described above will now be summarized.

The RDY terminal is positioned away from both the VBAT terminal and the HCLK terminal, which each may be a cause of noise, such that the RDY terminal is not adjacent to both the VBAT terminal and the HCLK terminal. Consequently, effects of noises on the RDY terminals that are used to indicate whether or not the command communication is allowed can be suppressed.

The HCLK terminal that may be a cause of noise is positioned between the HDATA terminal and the DATAL terminal, and the CLK terminal is positioned between the DATAL terminal and the DATAB terminal. In other words, the HDATA terminal, the HCLK terminal, the DATAL terminal, the CLK terminal, and the DATAB terminal are arranged in order from the last end in the attachment direction. Consequently, effects of noises caused by a clock signal into the RDY and the like terminals can be suppressed.

Further, in consideration of effects of noises, terminals for power supply are positioned away from terminals used for communication across the RDY terminals. Specifically, with the RDY terminal in between, on the head end side from the RDY terminal, terminals for power supply: the VBAT terminal, the PGND terminal, the V33 terminal, and the GND terminal are arranged in order from the head end side, and on the last end side from the RDY terminal, terminals used for communication: the DATAB terminal, the CLK terminal, the DATAL terminal, the HCLK terminal, and the HDATA terminal are arranged in order from the head end side. Consequently, effects of noises from the terminals for power supply such as the VBAT terminals and the terminals used for communication such as the HCLK or CLK terminals on the RDY terminals can be suppressed.

As for the HCLK terminals through which a clock signal used for the hot-line communication and the CLK terminals through which a clock signal used for the command data communication, the HCLK terminal is positioned farther away from the VBAT terminal than the CLK terminal. The reason is as follows. The clock signal transmitted to the interchangeable lens 3 through the CLK terminals are output by the body-side control unit 23 through the body-side communication unit 24. However, any noise affecting the clock signal transmitted to the camera body through the HCLK terminals from the interchangeable lens via the lens-side communication unit 34 may be a cause of erroneous recognition by the body-side control unit 23. This means that a noise affecting the clock signal on the HCLK terminals has a greater effect on the camera system 1.

As for the HCLK terminals and the GND terminals, the HCLK terminal is positioned farther away from the VBAT terminal than the GND terminal. In addition, the PGND terminal is positioned between the GND terminal and the VBAT terminal.

Consequently, the HCLK terminals through which the clock signal used for the hot-line communication is transmitted can be shielded from any noise originating from the VBAT terminals.

As for the CLK terminals and the GND terminals, the CLK terminal is positioned farther away from the VBAT terminal than the GND terminal. In addition, the PGND terminal is positioned between the GND terminal and the VBAT terminal. In this way, the CLK terminals through which the clock signal used for the command data communication is transmitted can be shielded from any noise originating from the VBAT terminals.

Terminal Arrangement with Wear Taken into Consideration

Description will now be made as to contacts between terminals during attachment and removal of the interchangeable lens 3 to and from the camera body 2.

During attachment of the interchangeable lens 3 to the camera body 2, the body-side terminals are brought into contact with the lens-side terminals in succession. The same applies to during removal of the interchangeable lens 3 from the camera body 2. In other words, the body-side terminals, which are pins protruding from the body-side terminal holding unit 22, are rubbed against the lens-side terminals, which are exposed conductive contact surfaces, in succession. Since more than one interchangeable lens may be attached and removed to and from one camera body, the body-side terminals are more prone to wear than the lens-side terminals. In particular, the body-side terminals located nearer to the last end in the attachment direction of the interchangeable lens 3 are rubbed against more lens-side terminals and more subjected to wear. Consequently, the body terminals located nearer to the last end are more subjected to wear on pin tips than the body-side terminals located nearer to the head end. Wear on the body-side terminals may have an effect on contactability with the lens-side terminals, and thus may cause unstable data communication.

In the present embodiment, the LDET (B) terminal is positioned at the headmost end in the attachment direction, and thus the LDET (B) terminal may be subjected to the least wear. In this way, the LDET (B) terminal and the LDET (L) terminal make a good contact with each other, resulting in less possibility of erroneous detection of attachment or removal of the interchangeable lens 3.

As described above, in the present embodiment, the CLK (B) terminal and the HCLK (B) terminal are positioned away from the VBAT (B) terminal in order to suppress effects of noises on communication. In other words, the VBAT (B) terminal is positioned at the second place from the head end in the attachment direction, and the CLK (B) terminal and the HCLK (B) terminal are positioned in the last end side away from the VBAT (B) terminal. Accordingly, the CLK (B) terminal and the HCLK (B) terminal are more subjected to wear than the LDET (B) terminal and the VBAT (B) terminal. In the present embodiment, the CLK (B) terminal and the HCLK (B) terminal are positioned immediately close to the first body-side claw 29a. Specifically, the CLK (B) terminal and the HCLK (B) terminal are positioned nearer to the inner circumferential edge of the first body-side claw 29a than the VBAT (B) terminal. In other words, the distance between the CLK (B) terminal and the inner circumferential edge of the first body-side claw 29a is shorter than the distance between the VBAT (B) terminal and the inner circumferential edge of the first body-side claw 29a, and the distance between the HCLK (B) terminal and the inner circumferential edge of the first body-side claw 29a is shorter than the distance between the VBAT (B) terminal and the inner circumferential edge of the first body-side claw 29a. As described above, the first flat spring 41a is provided behind the first body-side claw 29a, and the first lens-side claw 39a is pressed in the +Z direction (FIG. 1) by the first flat spring 41a. From the first flat spring 41a viewpoint, both the distance between the CLK (B) terminal and the first flat spring 41a and the distance between the HCLK (B) terminal and the first flat spring 41a are shorter than the distance between the VBAT (B) terminal and the first flat spring 41a. The LDET (B) terminal is similar to the VBAT (B) terminal; both the distance between the CLK (B) terminal and the first flat spring 41a and the distance between the HCLK (B) terminal and the first flat spring 41a are shorter than the distance between the LDET (B) terminal and the first flat spring 41a. Consequently, both the CLK (B) terminal and the HCLK (B) terminal are pressed against the lens-side terminals more forcefully than the VBAT (B) terminal and the LDET (B) terminal are pressed against the lens-side terminals.

On the lens side, the CLK (L) terminal and the HCLK (L) terminal are positioned nearer to the inner circumferential edge of the first lens-side claw 39a than the VBAT (L) terminal. In other words, the distance between the CLK (L) terminal and the inner circumferential edge of the first lens-side claw 39a is shorter than the distance between the VBAT (L) terminal and the inner circumferential edge of the first lens-side claw 39a, and the distance between the HCLK (L) terminal and the inner circumferential edge of the first lens-side claw 39a is shorter than the distance between the VBAT (L) terminal and the inner circumferential edge of the first lens-side claw 39a. Accordingly, in the attachment completion state, the CLK (L) and HCLK (L) terminals located close to the first lens-side claw 39a are pressed against their corresponding body-side terminals by the first flat spring 41a. The LDET (L) terminal is similar to the VBAT (L) terminal; in the attachment completion state, both the distance between the CLK (L) terminal and the first flat spring 41a and the distance between the HCLK (L) terminal and the first flat spring 41a are shorter than the distance between the LDET (L) terminal and the first flat spring 41a. Consequently, in the attachment completion state, a stronger pressing force against the body-side terminals acts on the CLK (L) terminal and HCLK (L) terminal than the LDET (L) terminal are pressed against the body-side terminals. Consequently, even if the CLK (B) terminal or the HCLK (B) terminal is subjected to wear, good contact can be maintained, resulting in a stable clock signal and stable data communication. In addition, for example, even in case of impact on the camera body 2 or the interchangeable lens 3 while the attachment completion state is maintained, contact between the CLK (B) terminal and the CLK (L) terminal and contact between the HCLK (B) terminal and the HCLK (L) terminal can be maintained.

Even in the case where the first lens-side claw 39a has a partial cutout, a combination of a protruding portion and a cut-out portion located in an area where they face the first body-side claw 29a shall serve as the first lens-side claw. As for how the cutout is made, the lens-side claw may be circumferentially separated into two or more parts; a part of the lens-side claw may be cut out; or at least a part of the lens-side claw may be cut out such that a radial direction length is shortened. A circumferential length of the lens-side claw may be altered to the extent that the corresponding body-side through section can pass therethrough. The same applies to the second lens-side claw 39b, the third lens-side claw 39c, and fourth lens-side claw 39d. A radial thickness of the cylindrical section may be altered as necessary and the shape may have at least a partial inward protrusion as compared to the cylindrical section of the present embodiment.

As described above, the CLK (B) terminal and the HCLK (B) terminal are more subjected to wear than the LDET (B) terminal and the VBAT (B) terminal. In the present embodiment, the CLK (B) terminal and the HCLK (B) terminal are both positioned immediately close to the first body-side claw 29a. Specifically, the CLK (B) terminal and the HCLK (B) terminal are positioned nearer to the inner circumferential edge of the first body-side claw 29a than the LDET (B) terminal and the VBAT (B) terminal. In other words, the distance between the CLK (B) terminal and the inner circumferential edge of the first body-side claw 29a is shorter than the distance between the LDET (B) terminal and the inner circumferential edge of the first body-side claw 29a or the distance between the VBAT (B) terminal and the inner circumferential edge of the first body-side claw 29a, and the distance between the HCLK (B) terminal and the inner circumferential edge of the first body-side claw 29a is shorter than the distance between the LDET (B) terminal and the inner circumferential edge of the first body-side claw 29a or the distance between the VBAT (B) terminal and the inner circumferential edge of the first body-side claw 29a. As described above, the first flat spring 41a is provided behind the first body-side claw 29*a*, and the first lens-side claw 39*a* is pressed in the +Z direction (FIG. 1) by the first flat spring 41*a*. From the first flat spring 41*a* viewpoint, both the distance between the CLK (B) terminal and the first flat spring 41*a* and the distance between the HCLK (B) terminal and the first flat spring 41*a* are shorter than the distance between the LDET (B) terminal or the VBAT (B) terminal and the first flat spring 41*a*.

On the lens side, the CLK (L) terminal and the HCLK (L) terminal are positioned nearer to the inner circumferential edge of the first lens-side claw 39*a* than the LDET (L) terminal and the VBAT (L) terminal. In other words, the distance between the CLK (L) terminal and the inner circumferential edge of the first lens-side claw 39*a* is shorter than the distance between the LDET (L) terminal and the inner circumferential edge of the first lens-side claw 39*a* or the distance between the VBAT (L) terminal and the inner circumferential edge of the first lens-side claw 39*a*, and the distance between the HCLK (L) terminal and the inner circumferential edge of the first lens-side claw 39*a* is shorter than the distance between the LDET (L) terminal the inner circumferential edge of the first lens-side claw 39*a* or the distance between the VBAT (L) terminal and the inner circumferential edge of the first lens-side claw 39*a*. Accordingly, the CLK (L) terminal and the HCLK (L) terminal located close to the first lens-side claw 39*a* are pressed against their corresponding body-side terminals by the first flat spring 41*a*. Consequently, both the CLK (B) terminal and the HCLK (B) terminal are pressed against the lens-side terminals more forcefully than the LDET (B) terminal or the VBAT (B) terminal. Consequently, even if the CLK (B) terminal or the HCLK (B) terminal is subjected to wear, good contact can be maintained, resulting in stable data communication. In addition, for example, even in case of impact on the camera body 2 or the interchangeable lens 3 while the attachment completion state is maintained, contact between the CLK (B) terminal or the HCLK (B) terminal and the respective corresponding lens-side terminal can be maintained.

In the present embodiment, the CLK (B) terminal and the HCLK (B) terminal are also near the fourth body-side claw 29*d*. Specifically, both the CLK (B) terminal and the HCLK (B) terminal are positioned nearer to the fourth body-side claw 29*d* than the VBAT (B) terminal or the LDET (B) terminal. In other words, the distance between the CLK (B) terminal and the fourth body-side claw 29*d* is shorter than the distance between the VBAT (B) terminal and the fourth body-side claw 29*d* or the distance between the LDET (B) terminal and the fourth body-side claw 29*d*, and the distance between the HCLK (B) terminal and the fourth body-side claw 29*d* is shorter than the distance between the VBAT (B) terminal and the fourth body-side claw 29*d* or the distance between the LDET (B) terminal and the fourth body-side claw 29*d*. As described above, the fourth flat spring 41*d* is provided behind the fourth body-side claw 29*d*, and the fourth lens-side claw 39*d* is pressed in the +Z direction (FIG. 1) by the fourth flat spring 41*d*. Accordingly, each the CLK (B) terminal and the HCLK (B) terminal located near the fourth lens-side claw 39*d* are respectively pressed against the corresponding lens-side terminal stronger and in a more stable manner than the VBAT (B) terminal or the LDET (B) terminal by the fourth flat spring 41*d*.

The distance between the CLK (B) terminal and the first body-side claw 29*a* (the same applies to the fourth lens-side claw 39*d* that is omitted in the following description) as described above refers to a distance in a straight line between one end of the first body-side claw 29*a* and the CLK (B) terminal, and may be defined as a distance in a straight line between the other end of the first body-side claw 29*a* and the CLK (B) terminal. Alternatively, the distance between the CLK (B) terminal and the first body-side claw 29*a* as described above may be defined as a distance in a straight line between a middle position of the first body-side claw 29*a* in the circumferential direction of the body-side mount 21 and the CLK (B) terminal. Each of the distances between other body-side terminals such as the HCLK (B) terminal, the VBAT (B) terminal, and the LDET (B) terminal and the first body-side claw 29*a* are also a distances in a straight line. The distance between the first flat spring 41*a* (or the fourth flat spring 41*d*) and each of body-side terminals are also a distance in a straight line.

The distance between the CLK (B) terminal and the first body-side claw 29*a* (the same applies to the fourth body-side claw 29*d* that is omitted in the following description) as described above may be defined as a distance on the arc between one end of the first body-side claw 29*a* in the circumferential direction of the body-side mount 21 and the CLK (B) terminal, or may be defined as a distance on the arc between the other end of the first body-side claw 29*a* and the CLK (B) terminal. Alternatively, the distance between the CLK (B) terminal and the first body-side claw 29*a* as described above may be defined as a distance on the arc between a middle position of the first body-side claw 29*a* in the circumferential direction of the body-side mount 21 and the CLK (B) terminal. The distances between other body-side terminals such as the HCLK (B) terminal, the VBAT (B) terminal, and the LDET (B) terminal and the first body-side claw 29*a* may be also a distances on the arc. The distances between the first flat spring 41*a* (or the fourth flat spring 41*d*) and each of body-side terminals may be also a distances on the arc.

Although description has been made as to the camera body 2, the same applies to the interchangeable lens 3. In the present embodiment, the CLK (L) terminal and the HCLK (L) terminal are both positioned immediately close to the first lens-side claw 39*a*. Specifically, both the CLK (L) terminal and the HCLK (L) terminal are positioned nearer to the first lens-side claw 39*a* than the VBAT (L) terminal or the LDET (L) terminal. In other words, the distance between the CLK (L) terminal and the first lens-side claw 39*a* is shorter than the distance between the VBAT (L) terminal or the distance between the LDET (L) terminal and the first lens-side claw 39*a*, and the distance between the HCLK (L) terminal and the first lens-side claw 39*a* is shorter than the distance between the VBAT (L) terminal and the first lens-side claw 39*a* or the distance between the LDET (L) terminal and the first lens-side claw 39*a*. The first lens-side claw 39*a* is pressed in the +Z direction (FIG. 1) by the first flat spring 41*a* on the body side. Accordingly, similarly to those described above, each the CLK (L) terminal and the HCLK (L) terminal located near the first lens-side claw 39*a* are pressed against the corresponding body-side terminal more forcefully than the VBAT (L) terminal or the LDET (L) terminal by the first flat spring 41*a*.

In the present embodiment, as illustrated in FIG. 5A, the CLK (B) terminal and the HCLK (B) terminal are arranged inside a sector (in the range of the angle of 50 degrees) formed by the center of the opening of the mount 21 (i.e. the position of the optical axis O of the interchangeable lens 3) and the arc-like first body-side claw 29*a*. Alternatively, the CLK (B) terminal and the HCLK (B) terminal are arranged inside a triangular area formed by the center of the opening of the mount 21 (i.e. the position of the optical axis O of the interchangeable lens 3) and the both ends of the first body-side claw 29a on the inner circumferential side. Accordingly, the first body-side claw 29a is not present on an extension of a dashed line 51 connecting the center of the opening of the mount 21 with the LDET (B) terminal, but the first body-side claw 29a is present on an extension of a dashed line 52 connecting the center of the opening of the mount 21 with the HCLK (B) terminal, and the first body-side claw 29a is also present on an extension of a dashed line 53 connecting the center of the opening of the mount 21 with the CLK (B) terminal. Consequently, in the attachment completion state, the CLK (B) terminal and the HCLK (B) terminal are pressed against the corresponding lens-side terminals more forcefully than the LDET (B) terminal.

As illustrated in FIG. 6, the CLK (L) terminal and the HCLK (L) terminal are arranged inside a sector (in the range of the angle of 60 degrees) formed by the center of the opening of the mount 31 (i.e. the position of the optical axis O of the interchangeable lens 3) and the arc-like first lens-side claw 39a. Alternatively, the CLK (L) terminal and the HCLK (L) terminal are arranged inside a triangular area formed by the center of the opening of the mount 31 (i.e. the position of the optical axis O of the interchangeable lens 3) and the both ends of the first lens-side claw 39a on the outer circumferential side. Accordingly, the first lens-side claw 39a is not present on an extension of a dashed line 61 connecting the center of the opening of the mount 31 with the LDET (L) terminal, but the first lens-side claw 39a is present on an extension of a dashed line 62 connecting the center of the opening of the mount 31 with the HCLK (L) terminal, and the first lens-side claw 39a is also present on an extension of a dashed line 63 connecting the center of the opening of the mount 31 with the CLK (L) terminal. Consequently, in the attachment completion state, the CLK (L) terminal and the HCLK (L) terminal are in contact with the corresponding body-side terminals more stably than the LDET (L) terminal. In other words, a stronger pressing force against the body-side terminals acts on the CLK (L) terminal and the HCLK (L) terminal than the LDET (L) terminal. As a result, even if the tip of the CLK (B) terminal or the HCLK (B) terminal is subjected to wear, the clock signal can stably be communicated between the camera body 2 and the interchangeable lens 3.

It may be possible to provide the following variations, and may also be possible to combine one or more variations with the present embodiment described above.

Variation 1

Any terminal used for the command data communication or the hot-line communication may also be provided with a function to transmit a power-on signal from the interchangeable lens 3 to the camera body 2. For example, the interchangeable lens 3 may have a power switch function. While the interchangeable lens 3 is in the attachment completion state and the camera system 1 is in a powered-off state, the power unit 26 supplies power to the lens-side control unit 33 of the interchangeable lens 3 through the V33 (B) terminal. Upon operation of the power switch of the interchangeable lens 3, for example, the lens-side control unit 33 outputs the power-on signal to the RDY (L) terminal via the lens-side communication unit 34. Upon detection of the power-on signal through the RDY (B) terminal via the body-side communication unit 24, the body-side control unit 23 makes the camera system 1 transition from the powered-off state to a powered-on state similarly to the case where a power switch (not illustrated) on the camera body 2 is operated.

Variation 2

In the embodiment, the DATAB (B) terminal is positioned on the head end side from the CLK (B) terminal in the attachment direction and the DATAL (B) terminal is positioned on the last end side; however, the positions of the DATAB (B) and DATAL (B) terminals may be exchanged. In other words, from the head end side in the attachment direction, the DATAL (B) terminal, the CLK (B) terminal, and the DATAB (B) terminal may be arranged in order.

It will be noted that, in the embodiment described above, although description has been made with reference to an interchangeable lens for a camera as an example for an accessory, the accessory is not limited to the interchangeable lens. For example, the accessory may include one that is attached between the camera body and the interchangeable lens to change the focal length of the interchangeable lens, such as a tele converter, a wide converter, or a close up ring. Alternatively, the embodiment may be applicable to a mount adapter or the like for attaching an accessory including the interchangeable lens of a different mount standard to the above-described camera body of a certain mount standard. In other words, the embodiment may be applicable to any accessory as long as it is attached to a mount of a camera body to use. In these cases, the lens-side terminal group, the lens-side claws 39, and the lens-side communication unit 34 respectively correspond to accessory-side terminal group, accessory-side protruding portions, and an accessory-side communication unit of the accessory, and so on.

In the embodiment described above, although description has been made as to an accessory that can be removably attached to a camera body, the camera body described above may be a mount adapter for attaching an interchangeable lens of the above-described mount standard to a camera body that has a different mount standard from the above, or the embodiment may be configured to make the above-described accessory attachable to the mount adapter.

REFERENCE SIGNS LIST

1 . . . camera system, 2 . . . camera body, 3 . . . interchangeable lens, 21 . . . body-side mount, 22 . . . body-side terminal holding unit, 31 . . . lens-side mount, 32 . . . lens-side terminal holding unit

The invention claimed is:

1. An accessory that can be attached to a camera body, the camera body including (i) a plurality of camera-side terminals, (ii) a camera-side protruding portion that protrudes toward a center of an opening of an accessory mount section, and (iii) an elastic member provided at a position corresponding to the camera-side protruding portion, the accessory comprising:
a first terminal configured to be brought into contact with a first camera-side terminal of the plurality of camera-side terminals so as to cause a change in a voltage at the first camera-side terminal;
an eighth terminal configured to be brought into contact with a first camera-side clock terminal of the plurality of camera-side terminals so that a first clock signal, which is used to transmit a first data signal from the camera body to the accessory, is input thereto;
a tenth terminal configured to be brought into contact with a second camera-side clock terminal of the plurality of camera-side terminals so that the tenth terminal outputs a second clock signal, which is used to transmit a second data signal from the accessory to the camera body; and
an accessory-side protruding portion that is configured to be pressed toward the camera body side by the elastic member, wherein the eighth terminal and the tenth terminal are arranged such that both of a distance between the eighth terminal and the accessory-side protruding portion and a distance between the tenth terminal and the accessory-side protruding portion are shorter than a distance between the first terminal and the accessory-side protruding portion.

2. The accessory according to claim 1, further comprising a resistor connected to the first terminal, the voltage at the first camera-side terminal being pulled down by way of the resistor upon contact of the first terminal with the first camera-side terminal.

3. The accessory according to claim 1, further comprising:
a ninth terminal configured to be brought into contact with a ninth camera-side terminal of the plurality of camera-side terminals so that the ninth camera-side terminal outputs a third data signal to the camera body by using the first clock signal, wherein:
the camera body includes a plurality of the camera-side protruding portions;
the accessory-side protruding portion is configured to be moved in a circumferential direction from (i) an insertion position, in which the accessory-side protruding portion is inserted between two of the plurality of camera-side protruding portions adjacent to each other in the circumferential direction, into (ii) an attachment position, in which the accessory-side protruding portion is brought into contact with one of the plurality of camera-side protruding portions at a contacting portion; and
the ninth terminal is brought into contact with the second camera-side clock terminal and thereafter the ninth camera-side terminal while the accessory-side protruding portion is moved from the insertion position to the attachment position.

4. The accessory according to claim 3, further comprising:
an eleventh terminal that configured to be brought into contact with an eleventh camera-side terminal of the plurality of camera-side terminals so that the eleventh camera-side terminal is a terminal to which the second data signal is input by using the second clock signal, wherein
the tenth terminal is positioned between the ninth terminal and the eleventh terminal.

5. The accessory according to claim 1, further comprising:
a seventh terminal configured to be brought into contact with a seventh camera-side terminal of the plurality of camera-side terminals, wherein:
the camera body includes a plurality of the camera-side protruding portions;
the accessory-side protruding portion is configured to be moved in a circumferential direction from (i) an insertion position, in which the accessory-side protruding portion is inserted between two of the plurality of camera-side protruding portions adjacent to each other in the circumferential direction, into (ii) an attachment position, in which the accessory-side protruding portion is brought into contact with one of the plurality of camera-side protruding portions at a contacting portion; and
the seventh terminal is brought into contact with the first camera-side clock terminal, the second camera-side clock terminal, and thereafter the seventh camera-side terminal while the accessory-side protruding portion is moved from the insertion position to the attachment position.

6. The accessory according to claim 5, wherein:
the seventh terminal is a terminal to which the first data signal from the camera body is input.

7. The accessory according to claim 5, wherein:
the first camera-side terminal is brought into contact with only the first terminal while the accessory-side protruding portion is moved from the insertion position to the attachment position.

8. The accessory according to claim 5, wherein:
the first terminal is positioned on a head in a moving direction of the accessory from the insertion position to the attachment position.

9. The accessory according to claim 5, further comprising:
a second terminal that is configured to be brought into contact with a second camera-side terminal of the plurality of camera-side terminals;
a third terminal that is configured to be brought into contact with a third camera-side terminal of the plurality of camera-side terminals;
a fourth terminal that is configured to be brought into contact with a fourth camera-side terminal of the plurality of camera-side terminals;
a fifth terminal that is configured to be brought into contact with a fifth camera-side terminal of the plurality of camera-side terminals;
a sixth terminal that is configured to be brought into contact with a sixth camera-side terminal of the plurality of camera-side terminals;
a ninth terminal that is configured to be brought into contact with a ninth camera-side terminal of the plurality of camera-side terminals; and
an eleventh terminal that is configured to be brought into contact with an eleventh camera-side terminal of the plurality of camera-side terminals, wherein
among the first terminal, the second terminal, the third terminal, the fourth terminal, the fifth terminal, the sixth terminal, the seventh terminal, the eighth terminal, the ninth terminal, the tenth terminal, and the eleventh terminal, the first terminal is positioned on a head in a moving direction of the accessory from the insertion position to the attachment position.

10. The accessory according to claim 9, wherein:
the second terminal is configured to be brought into contact with the second camera-side terminal, which supplies a first power;
the third terminal is configured to be brought into contact with the third camera-side terminal, which serves as a first ground terminal corresponding to the first power;
the fourth terminal is configured to be brought into contact with the fourth camera-side terminal, which supplies a second power different from the first power;
the fifth terminal is configured to be brought into contact with the fifth camera-side terminal, which serves as a second ground terminal corresponding to the second power;
the sixth terminal is configured to be brought into contact with the sixth camera-side terminal, which detects whether or not communication in synchronization with the first clock signal is allowed;
the seventh terminal is configured to be brought into contact with the seventh camera-side terminal, which outputs the first data signal from the camera body to the accessory in synchronization with the first clock signal;
the ninth terminal is configured to be brought into contact with the ninth camera-side terminal, to which a third data signal is input from the accessory to the camera body in synchronization with the first clock signal; and the eleventh terminal is configured to be brought into contact with the eleventh camera-side terminal, to which the second data signal is input from the accessory to the camera body in synchronization with the second clock signal.

11. The accessory according to claim 10, wherein:
the first terminal, the second terminal, the third terminal, the fourth terminal, the fifth terminal, the sixth terminal, the seventh terminal, the eighth terminal, the ninth terminal, the tenth terminal, and the eleventh terminal are arranged in order along the moving direction of the accessory from the insertion position to the attachment position.

\* \* \* \* \*